US008412999B2

(12) United States Patent
Lee et al.

(10) Patent No.: US 8,412,999 B2
(45) Date of Patent: Apr. 2, 2013

(54) METHOD FOR SPECIFYING TRANSPORT BLOCK TO CODEWORD MAPPING AND DOWNLINK SIGNAL TRANSMISSION METHOD USING THE SAME

(75) Inventors: Moon Il Lee, Anyang-si (KR); Hyun Soo Ko, Anyang-si (KR); Bin Chul Ihm, Anyang-si (KR); Wook Bong Lee, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 916 days.

(21) Appl. No.: 12/457,596

(22) Filed: Jun. 16, 2009

(65) Prior Publication Data
US 2010/0031117 A1   Feb. 4, 2010

Related U.S. Application Data

(60) Provisional application No. 61/075,020, filed on Jun. 24, 2008.

(30) Foreign Application Priority Data

Oct. 13, 2008  (KR) .................. 10-2008-0100021

(51) Int. Cl.
  *H04J 1/00* (2006.01)
  *H04W 76/00* (2009.01)
(52) U.S. Cl. ................... 714/748; 370/329; 370/335
(58) Field of Classification Search .............. 714/748; 370/329, 335
See application file for complete search history.

(56) References Cited

U.S. PATENT DOCUMENTS

| 7,391,755 | B2 * | 6/2008 | Gopalakrishnan et al. ... | 370/334 |
| 8,064,394 | B2 * | 11/2011 | Jongren et al. .............. | 370/329 |
| 8,194,601 | B2 * | 6/2012 | Han et al. ................... | 370/329 |
| 8,320,486 | B2 * | 11/2012 | Kotecha ..................... | 375/267 |
| 2005/0180325 | A1 | 8/2005 | Niemela et al. | |
| 2007/0076654 | A1 | 4/2007 | Bachl et al. | |
| 2009/0098876 | A1 * | 4/2009 | Khan et al. ................. | 455/445 |
| 2009/0225737 | A1 * | 9/2009 | Kim et al. .................. | 370/342 |
| 2011/0019764 | A1 * | 1/2011 | Chung et al. ............... | 375/295 |
| 2011/0085507 | A1 * | 4/2011 | Jongren .................... | 370/329 |
| 2012/0008707 | A1 * | 1/2012 | Kim et al. .................. | 375/295 |

FOREIGN PATENT DOCUMENTS

JP    2004-135304 A    4/2004

OTHER PUBLICATIONS

LG Electronics, Efficient support of retransmission using codeword DTX and signaling, 3GPP TSG-RAN WG1 #51bis, R1-080263, Jan. 14, 2008.
LG Electronics, On the implementation of rank override using codeword DTX, 3GPP TSG-RAN WG1 #50bis, R1-074200, Oct. 8, 2007.

* cited by examiner

*Primary Examiner* — Joseph Schell
(74) *Attorney, Agent, or Firm* — McKenna Long & Aldridge LLP

(57) ABSTRACT

A method for specifying a transport block-to-codeword mapping relationship and a method for transmitting a downlink signal using the same are described. If a swap flag has a first logic value, a first transport block is mapped to a first codeword and a second transport block is mapped to a second codeword. If the swap flag has a second logic value, the first transport block is mapped to the second codeword and the second transport block is mapped to the first codeword. If the size of any one of two transport blocks is 0, the swap flag is not used.

7 Claims, 7 Drawing Sheets

Spatial Division Multiple Access

Spatial Multiplexing

US 8,412,999 B2

METHOD FOR SPECIFYING TRANSPORT BLOCK TO CODEWORD MAPPING AND DOWNLINK SIGNAL TRANSMISSION METHOD USING THE SAME

CROSS-REFERENCE TO RELATED APPLICATIONS

This application claims the benefit of the U.S. Provisional Application No. 61/075,020, filed on Jun. 24, 2008, which is hereby incorporated by reference as if fully set forth herein.

This application claims the benefit of the Korean Patent Application No. 10-2008-0100021, filed on Oct. 13, 2008, which is hereby incorporated by reference as if fully set forth herein.

BACKGROUND OF THE INVENTION

1. Field of the Invention

The present invention relates to a mobile communication system, and more particularly to a method for efficiently specifying a mapping relationship between transport blocks and codewords, and a method for efficiently transmitting a downlink signal using the same.

2. Discussion of the Related Art

Error control algorithms, which are currently used in communication systems, may be broadly classified into an automatic repeat request (ARQ) scheme and a forward error correction (FEC) scheme. The ARQ scheme includes stop-and-wait ARQ, go-back-N ARQ, selective repeat ARQ, etc. Stop-and-wait ARQ refers to a scheme for confirming whether a transmitted frame has been accurately received. And after confirming accurate reception of the previous frame, the transmitting side transmits the next frame. Go-back-N ARQ refers to a scheme for transmitting N successive data frames, and if transmission is not successful, all data frames followed by an error-generated frame are re-transmitted. Selective repeat ARQ refers to a scheme for selectively re-transmitting only error-generated frames.

Meanwhile, hybrid automatic repeat request (HARQ) refers to an error control scheme combining re-transmission and error correction that maximizes error correction coding capabilities of data received during re-transmission. HARQ may be divided into chase combining (CC) HARQ and incremental redundancy (IR) HARQ according to characteristics of transmitted bits during re-transmission. CC HARQ obtains a gain by raising a signal-to-noise ratio (SNR) in a receiving stage using data used for previous transmission in re-transmission. IR HARQ gains a coding gain in a receiving stage by combining redundancy bits during re-transmission to improve performance.

FIG. 1 is a view illustrating the concept of a stop-and-wait ARQ scheme in HARQ.

In a stop-and-wait ARQ protocol, a determination as to whether to re-transmit data is made by individually receiving an acknowledgement (ACK)/negative acknowledgement (NACK) signal from a receiving stage after one process block is transmitted. Although the stop-and-wait ARQ scheme is the simplest and most efficient transmission method, link transmission efficiency is lowered by a round trip time (RTT) until a transmitting stage receives the ACK/NACK signal from the receiving stage.

FIG. 2 is a view illustrating an N-channel stop-and-wait HARQ protocol scheme.

The N-channel stop-and wait HARQ protocol scheme performs N independent stop-and-wait HARQ operations simultaneously, in order to overcome a shortcoming described with reference to FIG. 1. The N-channel stop-and-wait HARQ protocol scheme can reduce a processing delay.

Meanwhile, a multiple-input multiple-output (MIMO) scheme increases system capacity by simultaneously transmitting multiple data streams spatially using two or more transmit/receive antennas in a base station and a mobile terminal. The MIMO scheme can obtain a transmit diversity gain or a beamforming gain using multiple transmit antennas.

A transmit diversity scheme transmits the same data through multiple transmit antennas for reliable data transmission in fast time-varying channel environments and has an advantage in the case when the channel-related feedback information is not received from a receiving end. A beamforming scheme is used to increase a signal to interference plus noise ratio (SINR) of a receiver by multiplying weighting values for the multiple transmit antennas. In general, since a frequency division duplex (FDD) system has independent uplink and downlink channels, high reliability channel information is required to obtain a proper beamforming gain and therefore additional feedback information received from the receiver is used.

A spatial multiplexing scheme for a single user and for multiple users will be described in brief.

FIG. 3 is a view illustrating the concept of spatial multiplexing and spatial divisional multiple access schemes used in a MIMO communication system.

Spatial multiplexing for a single user is called SM or single user (SU)-MIMO and transmits data using a plurality of antennas for one user as shown in the left side of FIG. 3. Therefore, the capacity of a MIMO channel increases in proportion to the number of antennas. Meanwhile, spatial multiplexing for multiple users is called spatial division multiple access (SDMA) or multi-user (MU)-MIMO and transmits and receives data through a plurality of user antennas as shown in the right side of FIG. 3.

A MIMO scheme includes a single codeword (SCW) method which simultaneously transmits N data streams using one channel encoding block and a multiple codeword (MCW) method which transmits N data streams using M (where M is equal to or less than N) channel encoding blocks. Each channel encoding block generates independent codewords and each codeword is designed to be able to independently detect errors.

On the other hand, the above-described codeword is transmitted through one or more layers and information transmitted through codewords may be swapped for transmission. In a wireless communication system which can simultaneously transmit a plurality of codewords, the size of a specific codeword itself or information transmitted through the specific codeword may be 0 in some cases.

SUMMARY OF THE INVENTION

Technical Problem

Therefore, the present invention has been made in view of the above problems, and it is an object of the present invention to provide a method for definitely specifying swapping of information transmitted through each codeword through a simple swap flag in a multiple antenna communication system.

Especially, when the size of information transmitted through a specific codeword is 0, a mapping relationship between the swap flag and codewords are definitely specified.

Technical Solution

The object of the present invention can be achieved by providing a method for transmitting a downlink signal in a multiple antenna system which can simultaneously transmit two or less codewords. The method comprises mapping two or less transport blocks to the two or less codewords, mapping the two or less codewords to four or less layers and transmitting the layer-mapped codewords through a downlink data channel, and transmitting a swap flag which specifies a mapping relationship between the two or less transport blocks and the two or less codewords through a downlink control channel.

Both a first transport block and a second transport block may have a 0 size, and control information including a modulation and coding scheme index may be used to inform a receiving side of a case where the size of any one of the first and second transport blocks is 0.

If the size of any one of the first and second transport blocks is 0, the use of the swap flag may be reserved. If the size of any one of the first and second transport blocks is 0, the first or second transport block may be mapped to a first codeword irrespective of a logic value of the swap flag.

If the sizes of the first and second transport blocks are not 0 and if the swap flag has a first logic value, the first transport block may be mapped to a first codeword and the second transport block may be mapped to a second codeword, and if the sizes of the first and second transport blocks are not 0 and if the swap f lag has a second logic value, the first transport block may be mapped to the second codeword and the second transport block may be mapped to the first codeword.

The downlink data channel may be a physical downlink shared channel, and the downlink control channel may be a physical downlink control channel.

In another aspect of the present invention, provided herein is a method for specifying a mapping relationship between a transport block including first and second transport blocks and a codeword including first and second codewords. The method comprises specifying the mapping relationship between the transport block and the codeword according to a swap flag and the number of used transport blocks or codewords; mapping, when the number of used transport blocks or codewords is 1, a used transport block of the first and second transport blocks to the first codeword irrespective of a logic value of the swap flag; and mapping, when the number of used transport blocks or codewords is 2, each of the first and second transport blocks to the first or second codeword according to a logic value of the swap flag.

If the number of used transport blocks or codewords is 2 and if the swap flag has a logic value of 0, the first transport block may be mapped to the first codeword and the second transport block may be mapped to the second codeword, and if the number of used transport blocks or codewords is 2 and the swap flag has a logic value of 1, the first transport block may be mapped to the second codeword and the second transport block may be mapped to the first codeword.

Advantageous Effects

According to the embodiments of the present invention, a mapping relationship between codewords and transport blocks transmitted through the codewords is definitely specified in a multiple antenna communication system, and the mapping relationship can be indicated using a swap flag and/or transport block size information.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and/or devices are omitted or are shown in block diagram form, focusing on important features of the structures and/or devices, so as not to obscure the concept of the present invention. The same reference numbers will be used throughout this specification to refer to the same or like parts.

The present invention specifies the swapping of information transmitted through each codeword in a multiple antenna communication system and a mapping relationship between a swap flag and codewords when the size of information transmitted through a specific codeword is 0. Hereinafter, a transmission relationship of codewords in a multiple antenna system will be described.

Figure 1:
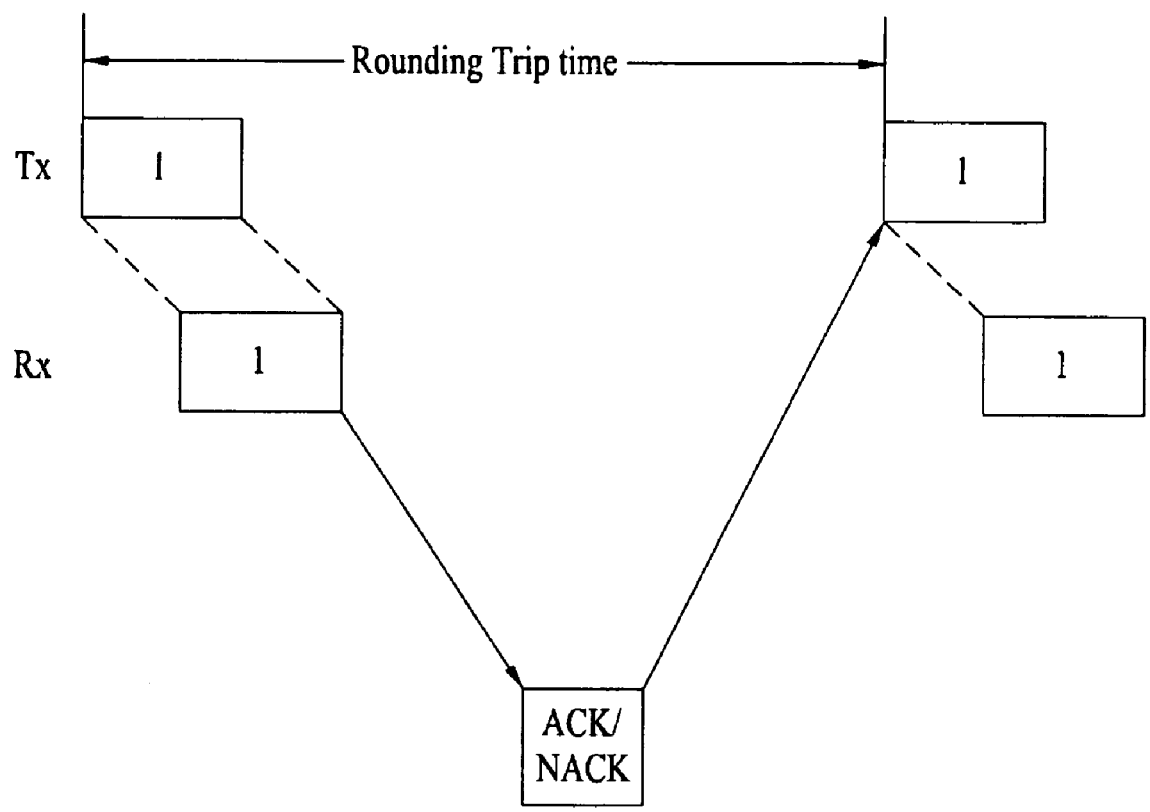
FIG. 1 is a view illustrating the concept of a stop-and-wait ARQ scheme in HARQ.
Figure 2:
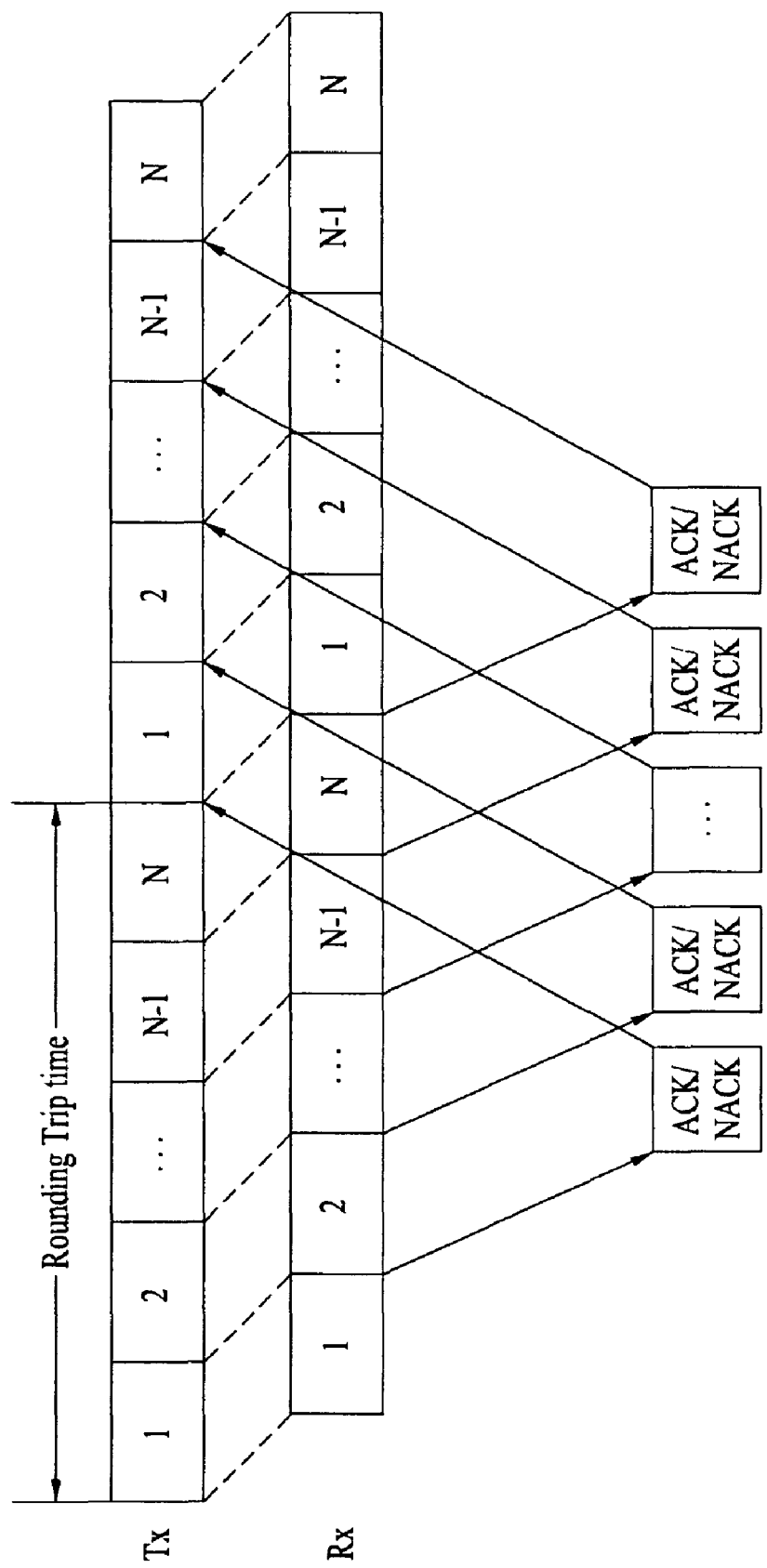
FIG. 2 is a view illustrating an N-channel stop-and wait HARQ protocol scheme.
Figure 3:
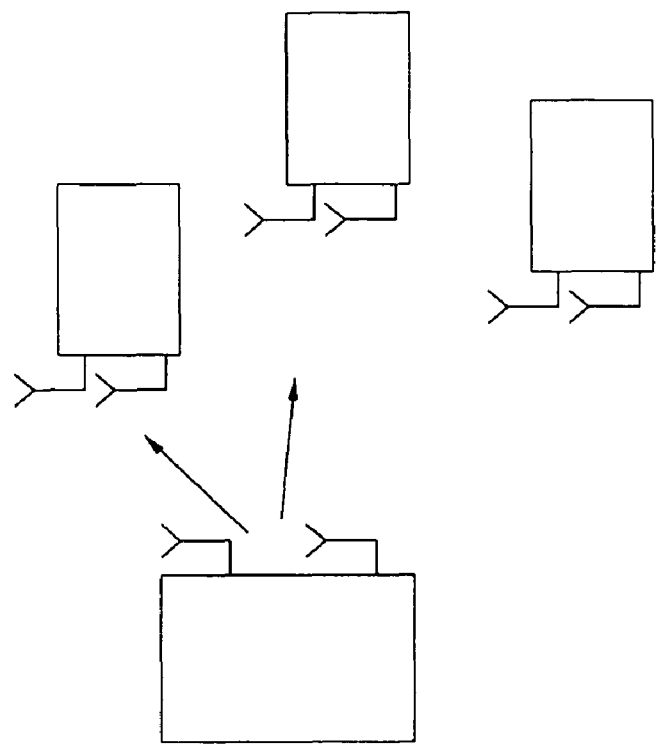
FIG. 3 is a view illustrating the concept of spatial multiplexing and spatial divisional multiple access schemes used in a MIMO communication system.
Figure 3:
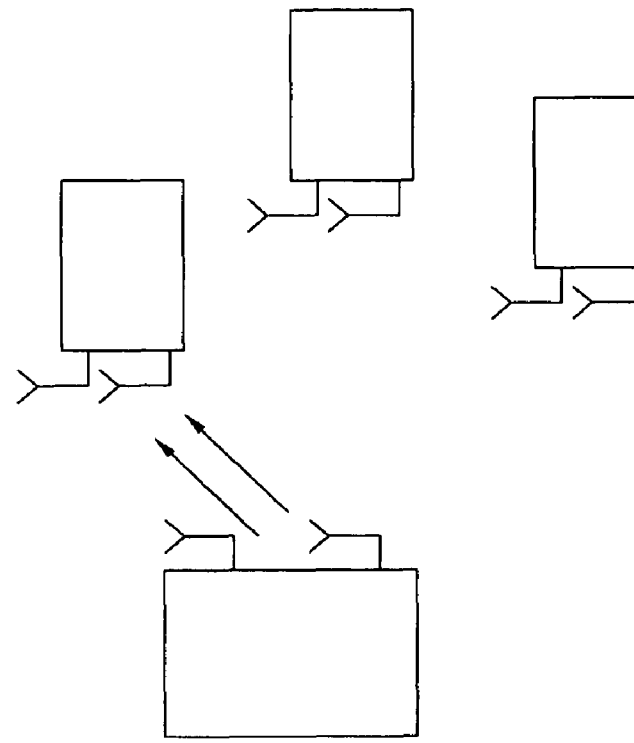
Figure 4:
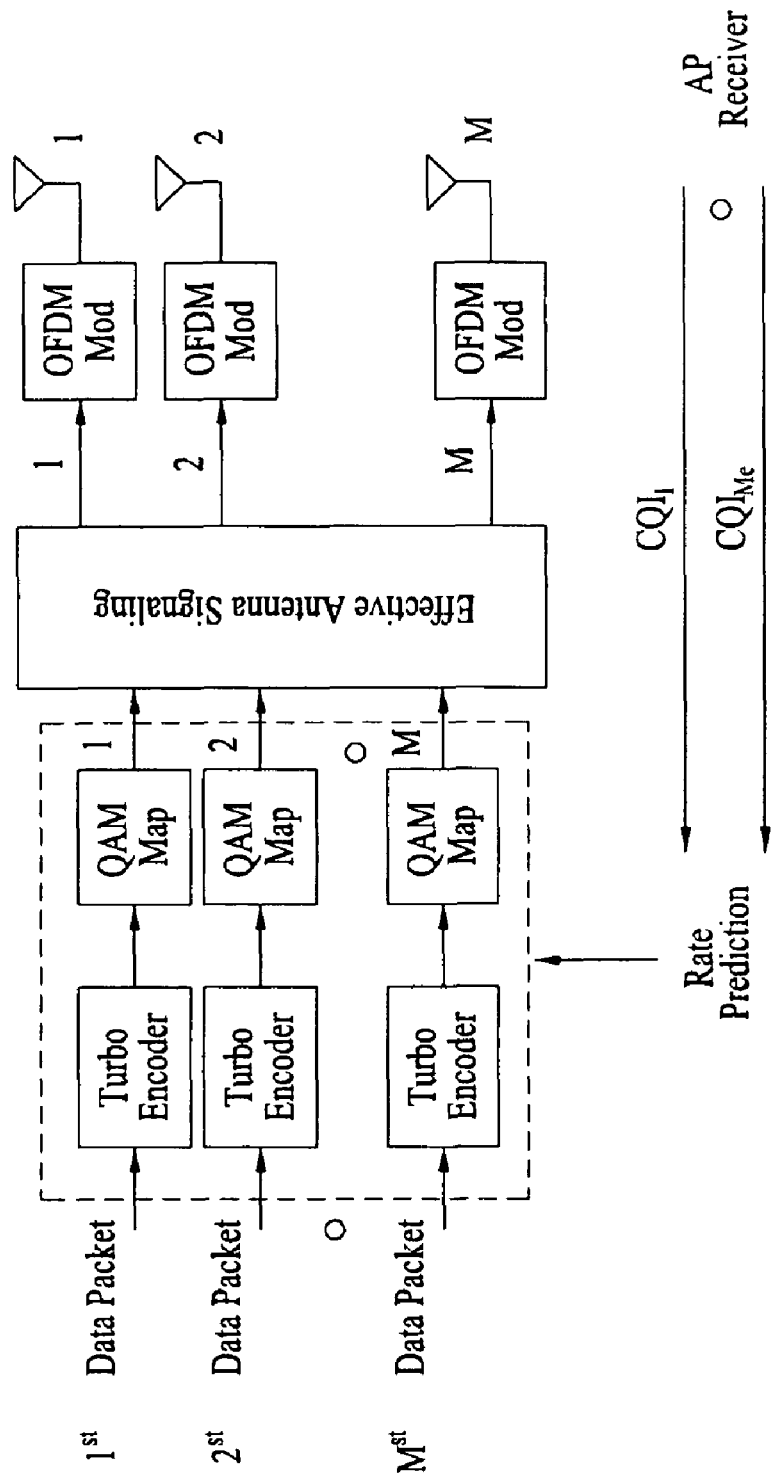
FIG. 4 is a view illustrating a structure of a transmitting stage of a MIMO communication system using multiple codewords.

FIG. 4 is a view illustrating a structure of a transmitting stage of a MIMO system using multiple codewords.

M data packets are generated as M codewords through encoding (for example, turbo encoding as shown in FIG. 4) and modulation (for example, quadrature amplitude modulation (QAM) as shown in FIG. 4). Each codeword has an independent HARQ process block. M modulated data symbols are simultaneously encoded in a MIMO stage according to a multiple antenna scheme and are transmitted through respective physical antennas. A receiving stage can control a spatial multiplexing rate, a coding rate, and a modulation scheme by feeding back channel quality information about a multiple antenna channel state.

For MIMO transmission as shown in FIG. 4, there are needed modulation and coding scheme (MCS) information used by the transmitting stage, a new data indicator (NDI) as to whether transmitted data is new data or re-transmitted data, redundancy version (RV) information as to which subpacket is re-transmitted upon re-transmission, and the like.

A mapping relationship between codewords and physical antennas may be random.

Figure 5:
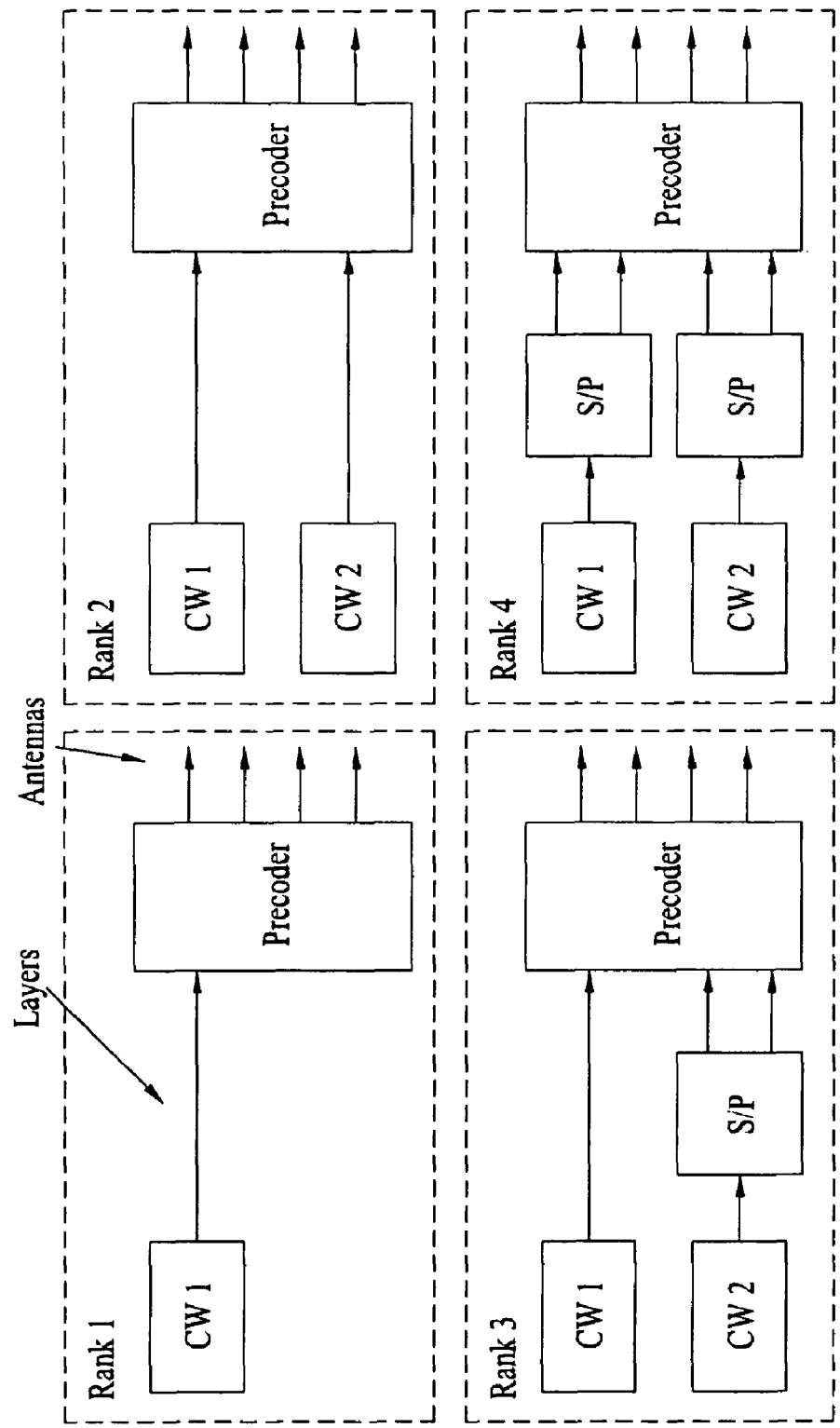
FIG. 5 is a view illustrating a mapping relationship between codewords and physical antennas.

FIG. 5 is a view illustrating a mapping relationship between codewords and physical antennas.

Specifically, FIG. 5 illustrates codeword-to-layer mapping according to a spatial multiplexing rate in a downlink 3GPP TS 36.211. When a spatial multiplexing rate is 1, one codeword is mapped to one layer, and data generated in one layer is encoded by a precoding scheme so as to be transmitted through four antennas. When a spatial multiplexing rate is 2, two codewords are mapped to two layers and then mapped to four antennas by a precoder. For a spatial multiplexing rate of 3, one of two codewords is mapped to two layers by a serial-to-parallel (S/P) converter. As a result, a total of two codewords are mapped to three layers and then mapped to four antennas by a precoder. If a spatial multiplexing rate is 4, each of two codewords is mapped to two layers by an S/P converter. Consequently, a total of four layers are mapped to four antennas by a precoder.

Namely, a base station having four transmit antennas can have a maximum of four layers and four independent codewords. However, FIG. 5 illustrates a system configured to have a maximum of only two codewords. Therefore, assuming that in the system shown in FIG. 5, each codeword has an independent HARQ process, a maximum of two independent HARQ processes can be transmitted.

Meanwhile, location of information transmitted through codewords CW1 and CW2 may be interchanged.

Figure 6:
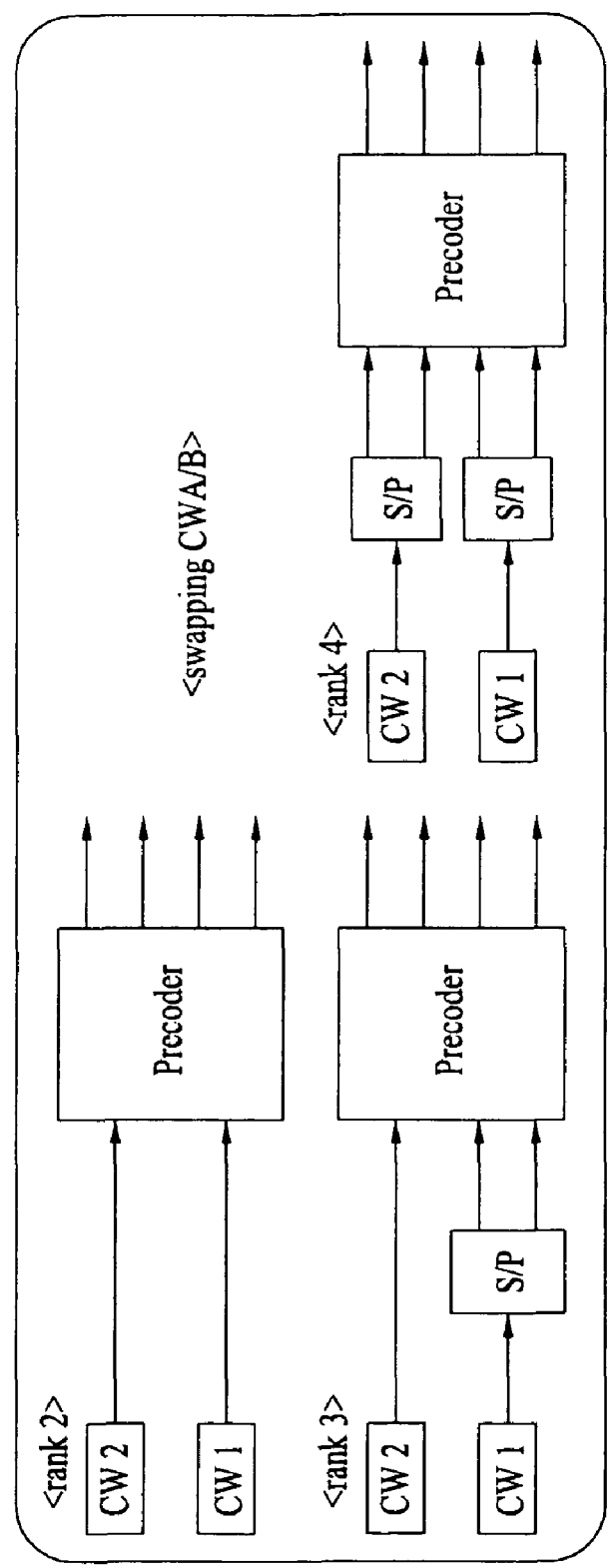
FIG. 6 is a view illustrating the concept of transmission through swapping of codewords.

FIG. 6 is a view illustrating the concept of transmission through swapping of codewords.

In FIG. 6, a swapped form of codewords CW1 and CW2 is shown when two or more codewords are transmitted in the layer mapping relationship shown in FIG. 5. Swapping may be indicated through a logic value '1' or '0' of a one-bit swap flag. However, if locations of codewords CW1 and CW2 are interchanged, the codeword-to-layer mapping shown in FIG. 5 should be modified.

Therefore, one exemplary embodiment of the present invention proposes setting of the swap flag so as to indicate swapping of mapping of a transport block mapped to each codeword rather than swapping of a codeword itself. Then the codeword-to-layer mapping relationship shown in FIG. 5 can be fixedly used irrespective of the swap flag.

That is, in a downlink signal transmitting method according to the exemplary embodiment of the present invention, a mapping relationship between each transport block and each codeword may be indicated using a one-bit swap flag in a process of mapping two or less transport blocks to two or less codewords. Thereafter, information mapped to two or less codewords is mapped to four or less layers and transmitted through a downlink data channel, for example, a physical downlink shared channel (PDSCH) in a 3GPP LTE system. By this, the codeword-to-layer mapping relationship of FIG. 5 may be fixedly used in the form shown in FIG. 5 irrespective of the swap flag.

The swap flag may be transmitted through a downlink control channel, for example, a physical downlink control channel (PDCCH) in the 3GPP LTE system.

In a wireless communication system which can simultaneously transmit a plurality of codewords, the size of a specific codeword itself or information transmitted through the specific codeword may be 0 in some cases.

For example, it is assumed that a maximum of two codewords can be transmitted and a multiple antenna system has four transmit antennas. If a spatial multiplexing rate is 4, a first codeword CW1 may be transmitted through first and second layers, and a second codeword CW2 may be transmitted through third and fourth layers. In this case, an error can be detected in the unit of codewords. If an error is detected only in the first codeword CW1, the second codeword CW2 in which no errors are detected may not be used for retransmission. Moreover, transmission of the second codeword CW2 may have been completed and thus a buffer of the codeword CW2 may be empty.

Figure 7:
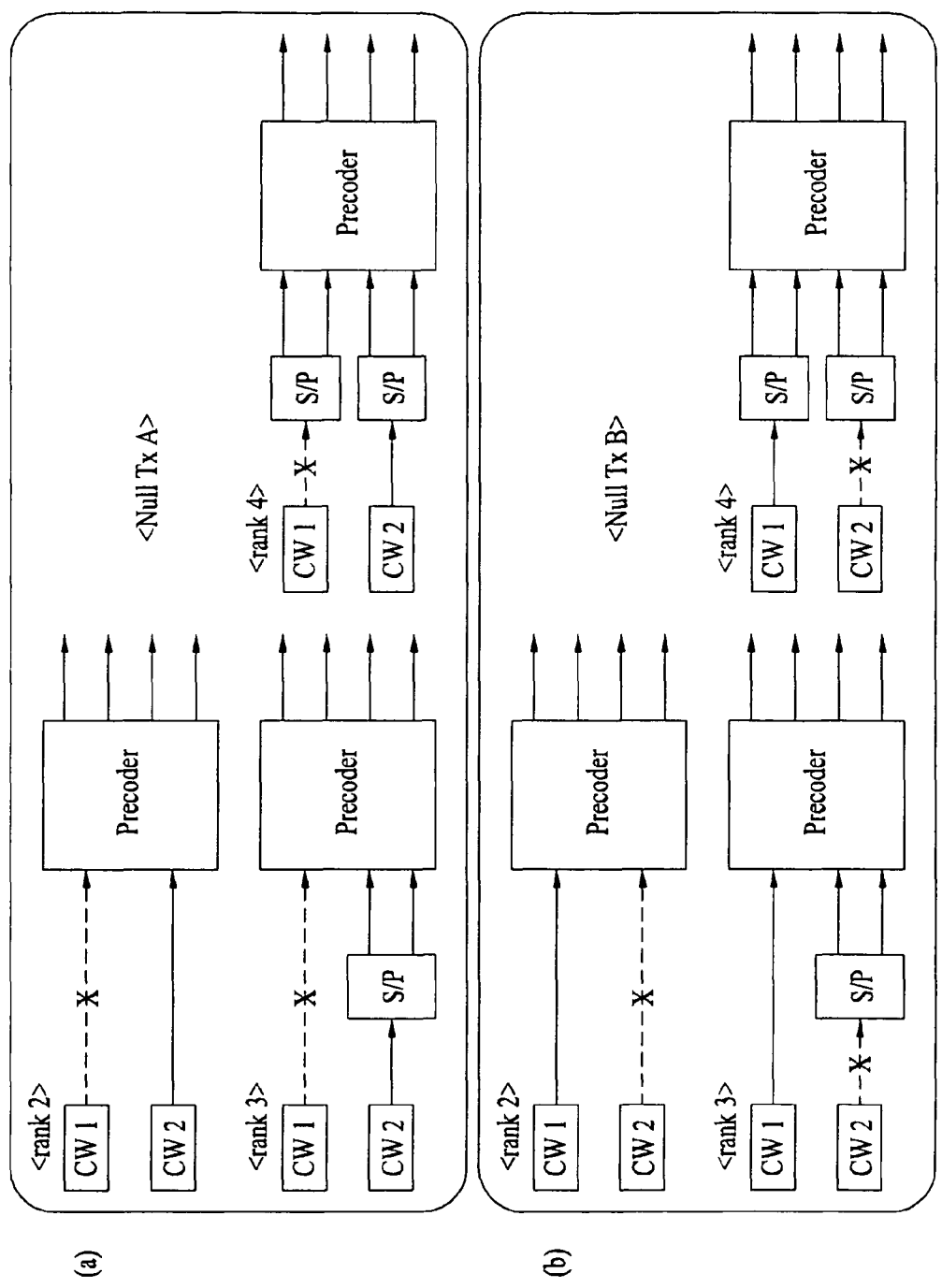
FIGS. 7A and 7B are views illustrating the concept of transmission of null data through a specific codeword.

FIGS. 7(a) and 7(b) are views illustrating the concept of transmission of null data through a specific codeword.

In more detail, FIGS. 7(a) and 7(b) illustrate the concept of transmitting null data through one cordword, when a buffer of one codeword is abruptly empty or a spatial multiplexing rate of a channel is decreased under the circumstance that data is transmitted with a spatial multiplexing rate of 2 or more in the layer mapping relationship shown in FIG. 5. In FIG. 7(a), null data is transmitted through a codeword CW1, and in FIG. 7(b), null data is transmitted through a codeword CW2.

The above method seemingly uses a multiple antenna scheme as if two codewords are all used, but in actuality a spatial multiplexing rate may be set to be small due to null data.

Information transmitted through the codeword may be considered as a transport block. If null data is transmitted through a specific codeword, the size of a transport block transmitted through a corresponding codeword may be interpreted as 0. For example, although in FIGS. 7(a) and 7(b) the codeword itself CW1 or the codeword itself CW2 is shown as being disabled, the disabled codeword CW1 or CW2 illustrates the concept including the case where the size of a first or second transport block mapped to the codewords CW1 or CW2 is 0.

In setting the size of a transport block to 0 (TBSx=0) when first and second transport blocks are transmitted through respective code blocks in a 3GPP LTE system, a method for setting the size of only the second transport block (x=2) to 0 and a method for setting the sizes of both the first and second transport blocks (x=1 and x=2) to 0 have recently been discussed. To achieve the methods, codeword-to-layer mapping should be fixedly used irrespective of a swap flag and only the transport block itself should be swapped. In the exemplary embodiment of the present invention, since the case where buffers of two transport blocks are all empty may occur, supporting both cases of when the size of the first transport block is 0 and when the size of the second transport block is 0 is proposed.

Further, it is preferable to implicitly transmit an indication that the size of any one transport block is 0 not through explicit control information but through other control information. In the exemplary embodiment of the present invention, control information including an MCS index is used. In more detail, an MCS index of 29 and a toggled NDI may be used as information representing that the size of any one transport block is 0. At this time, a new transport block, which does not have a size of 0, with the same HARQ process number may be a reference for NDI toggling.

Another exemplary embodiment of the present invention may use an MCS index of 0 and an RV of 1 as information representing that the size of one transport block is 0.

The above-described embodiments may be summarized using a table as follows.

TABLE 1

| TBS Mapping | Swap Flag | # of codewords |
|---|---|---|
| TB1 → CW1<br>TB2 → CW2 | '0' | 2 |

TABLE 1-continued

| TBS Mapping | Swap Flag | # of codewords |
|---|---|---|
| TB2 → CW1<br>TB1 → CW2 | '1' | 2 |
| TB1 → CW1<br>(TB2 indicating '0' TBS) | '0' | 1 |
| TB2 → CW1<br>(TB1 indicating '0' TBS) | '0' | 1 |

The above Table 1 shows an example of specifying a mapping relationship between transport blocks and codewords according to a swap flag and the number (#) of codewords (that is, the number of used transport blocks). If a user equipment uses only one codeword, the swap flag does not need to be considered in terms of the user equipment because only a codeword CW1 is used for transmission as shown in Table 1 That is, swapping flag may be reserved when any one of two transport block sizes is 0.

The following Table 2 shows a modified example of Table 1.

TABLE 2

| TBS Mapping | Swap Flag | # of codewords |
|---|---|---|
| TB1 → CW1<br>TB2 → CW2 | '0' | 2 |
| TB2 → CW1<br>TB1 → CW2 | '1' | 2 |
| TB1 → CW1<br>(TB2 indicating '0' TBS) | '0' | 1 |
| TB2 → CW1<br>(TB1 indicating '0' TBS) | '1' | 1 |

Unlike Table 1, in Table 2, a swap flag is set to 1 when a transport block TB2 is mapped to a codeword CW1 regardless of the number of transport block used. However, this is not meaningful because a swap flag is not considered when only one codeword is used.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The present invention may be used to efficiently transmit a downlink signal using a swap flag. The present invention is applicable to wireless communication systems using transport block-to-codeword mapping and codeword-to-antenna or layer mapping as well as the above-described 3GPP LTE system.

What is claimed is:

1. A method for transmitting a downlink signal in a multiple antenna system for simultaneously transmitting two or less codewords, the method comprising:
    mapping two or less transport blocks to the two or less codewords;
    mapping the two or less codewords to four or less layers and transmitting the layer-mapped codewords through a downlink data channel; and
    transmitting a swap flag which specifies a mapping relationship between the two or less transport blocks and the two or less codewords through a downlink control channel,
    wherein both a first transport block and a second transport block of the two or less transport blocks can have a size of 0, and
    control information including a modulation and coding scheme index is used to inform a receiving side of a case where the size of any one of the first and second transport blocks is 0.

2. The method according to claim 1, wherein the swap flag is reserved, when the size of any one of the first and second transport blocks is 0.

3. The method according to claim 1, wherein the first or second transport block is mapped to a first codeword irrespective of a logic value of the swap flag, when the size of any one of the first and second transport blocks is 0.

4. The method according to claim 1, wherein the first transport block is mapped to a first codeword and the second transport block is mapped to a second codeword when the sizes of the first and second transport blocks are not 0 and the swap flag has a first logic value, and
    wherein the first transport block is mapped to the second codeword and the second transport block is mapped to the first codeword when the sizes of the first and second transport blocks are not 0 and the swap flag has a second logic value.

5. The method according to claim 1, wherein the downlink data channel is a physical downlink shared channel (PDSCH), and the downlink control channel is a physical downlink control channel (PDCCH).

6. A method for specifying a mapping relationship between a transport block including first and second transport blocks and a codeword including first and second codewords, the method comprising:
    specifying the mapping relationship between the transport block and the codeword according to a swap flag and a number of used transport blocks or codewords;
    mapping, when the number of used transport blocks or codewords is 1, a used transport block among the first and second transport blocks to the first codeword irrespective of a logic value of the swap flag; and
    mapping, when the number of used transport blocks or codewords is 2, each of the first and second transport blocks to the first or second codeword according to a logic value of the swap flag.

7. The method according to claim 6, wherein the first transport block is mapped to the first codeword and the second transport block is mapped to the second codeword when the number of used transport blocks or codewords is 2 and the swap flag has a logic value of 0, and
    wherein the first transport block is mapped to the second codeword and the second transport block is mapped to the first codeword when the number of used transport blocks or codewords is 2 and the swap flag has a logic value of 1.

* * * * *